United States Patent [19]
Won

[11] Patent Number: 5,557,206
[45] Date of Patent: Sep. 17, 1996

[54] APPARATUS AND METHOD FOR DETECTING A WEAK INDUCED MAGNETIC FIELD BY MEANS OF TWO CONCENTRIC TRANSMITTER LOOPS

[75] Inventor: I. J. Won, Raleigh, N.C.

[73] Assignee: Geophex Ltd., Raleigh, N.C.

[21] Appl. No.: 393,191

[22] Filed: Feb. 23, 1995

[51] Int. Cl.[6] ............................ G01V 3/08; G01V 3/10
[52] U.S. Cl. ............................ 324/329; 324/262
[58] Field of Search .................. 324/326–329, 324/228, 232, 262

[56] References Cited

U.S. PATENT DOCUMENTS

| | | | |
|---|---|---|---|
| 4,255,711 | 3/1981 | Thompson | 324/329 |
| 4,293,816 | 10/1981 | Johnson | 324/329 |

Primary Examiner—Walter E. Snow

[57] ABSTRACT

The present invention provides an apparatus and method for creating a magnetic cavity in a region about the centerpoint of two concentric, magnetic field-generating electrical wire coils. The outer of the two coils generates a strong primary magnetic field that may induce a relatively weak magnetic field in a remote conductive material, such as subterranean mineral deposits. The inner of the two coils generates a secondary magnetic field having a smaller amplitude and an opposite polarity from the primary field. Various parameters of the apparatus are calculated so that the two oppositely polarized magnetic fields mutually cancel each other in a specified region inward of the two coils about their centerpoint, creating the magnetic cavity. A magnetic sensor can then be isolated within the magnetic cavity for detecting the weak induced magnetic field in the remote conductive material without interference from the nearby primary and secondary magnetic fields.

9 Claims, 6 Drawing Sheets

APPARATUS AND METHOD FOR DETECTING A WEAK INDUCED MAGNETIC FIELD BY MEANS OF TWO CONCENTRIC TRANSMITTER LOOPS

FIELD OF THE INVENTION

The present invention relates to the creation of a magnetic cavity by mutually canceling two magnetic fields of opposite polarities and particularly relates to an apparatus having two concentric coils that transport electric current in opposite directions, thereby generating two oppositely polarized magnetic fields that cancel each other in a specified region inwardly of the two coils.

BACKGROUND OF THE INVENTION

It is known that a primary, active dipolar magnetic field propagated from a generating source can be used to induce another magnetic field in a conductive material remote from the primary magnetic field source. This induced magnetic field can then be sensed by a remote magnetic sensor for detecting the presence of the conductive material. The sensor itself typically operates by producing an electrical potential, referred to as induced electromotive force (emf), when in the presence of a magnetic field, which in this instance is intended to be the induced magnetic field propagated from the remote conductive material.

However, as would be expected, the primary dipolar magnetic field, which induced the magnetic field in the remote conductive material in the first place, will also induce emf in the magnetic sensor. Because the induced magnetic field propagated by the remote conductive material is typically much weaker, having a far smaller amplitude, than the relatively strong primary magnetic field, the primary field tends to interfere with or even entirely obscure the inductive effects of the smaller induced field on the magnetic sensor. It is therefore necessary to isolate the magnetic sensor from the primary magnetic field so that the sensor can detect the much weaker induced field without being blinded by the primary field. Previously, such isolation was achieved by physically separating the sensor from the primary field transmitter by as great a distance as practically possible. The larger the distance, the smaller the amplitude or far-field strength of the primary magnetic field and, accordingly, the lesser interference with the detection of the induced field. It should be appreciated that a prior art self-contained electromagnetic sensing apparatus, which includes both a primary magnetic field transmitter and a magnetic field sensor, is necessarily a very large apparatus if it is to function properly.

Such electromagnetic propagation and sensing apparatuses have been used in areas such as geophysical exploration to detect and delineate geological formations, mineral ore deposits, and groundwater resources, as well as to detect buried man-made objects, such as underground tank systems, unexploded ordnance, burial trenches, drums, landfills, and contaminant plumes. Other areas in which such apparatuses could be used include marine bathymetry, which is the determination of water depth in a body of water, and the detection of submarine wakes and other military detection applications.

A typical electromagnetic sensing apparatus used in these areas is a large torpedo-shaped airborne device, which is suspended above the ground or water by a helicopter or fixed-wing aircraft. Such an apparatus could also be manually carried above the ground by engineers or technicians, but typically these apparatuses are too large to be easily managed without some type of mechanical assistance. Due to the separation required between the magnetic field transmitter and the induced field sensor, such apparatuses are typically up to approximately 20 feet long and may weigh up to several hundred pounds. For easier transportability and operation, a smaller apparatus is needed. However, using previous technology, a smaller apparatus would operate much less effectively due to the above-discussed interference of the primary magnetic field.

An additional problem with these large prior art electromagnetic sensing apparatuses relates to the electromagnetic fields generated by the aircraft or other machinery needed to carry the apparatuses above. Engines, revolving propeller blades, turbines, etc. in aircraft create a plethora of electromagnetic disturbances that can wreak havoc on a highly sensitive magnetic sensor near the aircraft. A smaller sensing apparatus, however, would require the use of a much smaller aircraft, which would create far fewer electromagnetic disturbances, or could even be easily carried by a technician with none of the electromagnetic disturbances associated with machinery.

Therefore, in view of the above, there is a great need for a practical, compact electromagnetic sensing apparatus, which includes both a magnetic field transmitter and a sensitive magnetic field sensor, wherein the sensor can be located in close physical proximity to the magnetic field transmitter yet be magnetically isolated from the transmitter.

SUMMARY AND OBJECTS OF THE INVENTION

The present invention provides an apparatus and method for creating a magnetic cavity in a region about a reference point or centerpoint of two concentric, magnetic field-generating electrical wire coils. The outer of the two coils generates a strong primary magnetic field that induces a relatively weak induced magnetic field in a remote conductive material external to the apparatus. The inner of the two coils generates a secondary magnetic field having a smaller amplitude and an opposite polarity from the primary field. Various parameters of the apparatus are calculated and the two coils are strategically positioned in relation to each other so that the two oppositely polarized magnetic fields mutually cancel each other in a specified region inward of the two coils about their centerpoint, creating the magnetic cavity. A highly sensitive magnetic sensor can then be isolated within the magnetic cavity for detecting the weak induced magnetic field in the remote conductive material without interference from the nearby primary and secondary magnetic fields.

In one embodiment of the present invention, the outer electrical wire coil is formed by winding a predetermined number of turns of wire into a coil of a predetermined radius. The inner electrical wire coil is formed the same way as the outer coil, except with a smaller radius, and is concentric with the outer coil. The inner coil is connected in series with the outer coil and is coplanar with the outer coil. Additionally, the coils are preferably circular. Electricity flows in opposite directions through the two coils, generating the primary and secondary magnetic fields with opposite polarities.

In the preferred embodiment, the magnetic sensor includes a third wire coil concentric with and having a smaller radius than the inner and outer coils. When the sensor is isolated within the magnetic cavity, the sensor produces zero emf induced from the primary and secondary magnetic fields. The sensor can then detect a very faint, remote induced magnetic field with no interference from the nearby primary and secondary fields.

It is therefore an object of the present invention to provide a compact, easily transported electromagnetic sensing apparatus that magnetically isolates a highly sensitive magnetic sensor from a primary magnetic field transmitter, yet allows the sensor to operate in close physical proximity to the transmitter.

It is also an object of the present invention to provide an apparatus having two concentric electrical wire coils that generate two oppositely polarized, dipolar magnetic fields, which cancel each other in a region inward of the two coils to create a magnetic cavity that is substantially devoid of magnetic flux of the two fields.

It is another object of the present invention to provide an apparatus that propagates a relatively strong primary dipolar magnetic field for inducing a magnetic field in a remote conductive material.

It is another object of the present invention to provide an apparatus having a magnetic sensor isolated within the magnetic cavity for sensing the external induced magnetic field with no interference from the nearby primary magnetic field that induces the external magnetic field.

It is still an additional object of the present invention to provide a method of producing a magnetic cavity in a strong magnetic field in which a magnetic sensor may be isolated for detecting a relatively weak, induced magnetic field in the presence of the nearby strong magnetic field.

Other objects and advantages of the present invention will become apparent and obvious from a study of the following description and the accompanying drawings, which are merely illustrative of such invention.

DETAILED DESCRIPTION OF THE INVENTION

The electromagnetic sensing apparatus of the present invention includes both a magnetic field transmitter and a highly sensitive magnetic sensor in close proximity to each other, housed within a small structure that is much more compact and less cumbersome than previously designed sensing apparatuses, which isolated the sensor from the transmitter by spacing them a great distance apart. The compact design of the apparatus of the present invention is made possible by the creation of a magnetic cavity within a strong, primary magnetic field generated by the transmitter, in which the sensor can be positioned free of any interference from the strong, nearby magnetic field. The sensor can then detect a far-away, weak, induced magnetic field, which is induced by the primary magnetic field itself, without being blinded by the much stronger primary field that is propagated from the nearby transmitter.

Figure 1:
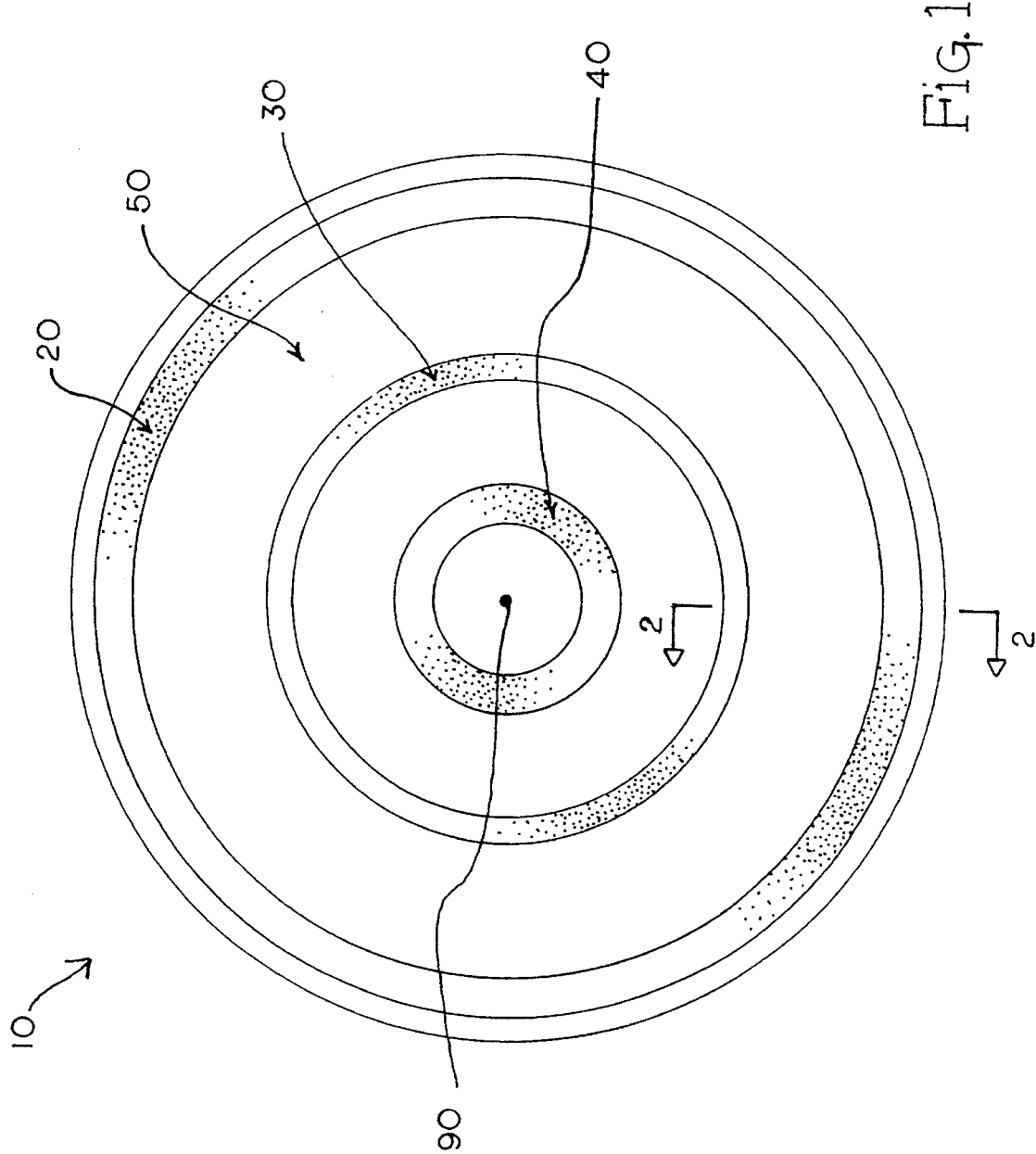
FIG. 1 is a plan view of the electromagnetic sensing apparatus of the present invention.

The electromagnetic sensing apparatus of the present invention, which is generally indicated by the numeral 10, includes an outer coil 20 for generating a strong primary magnetic field referred to by reference lines 81 (FIGS. 5 and 6), an inner coil 30 for generating a lower amplitude secondary magnetic field, referred to by reference lines 82 (FIGS. 5 and 6), of opposite polarity from the primary field 81, and a third sensor coil 40, all housed in a compact support disc 50. The outer coil 20 and the inner coil 30 are connected to an external time-varying power source, generally indicated by the numeral 60, and the sensor coil 40 is connected to a computer, generally indicated by the numeral 70, that measures emf induced in the sensor coil 40. As shown in FIG. 1, the outer coil 20 and the inner coil 30 are circular and coplanar, although it is contemplated that the coils could also be oval or even polygonal and could be disposed in parallel, coaxial planes rather than in the same plane, as they are shown here.

Figure 2:
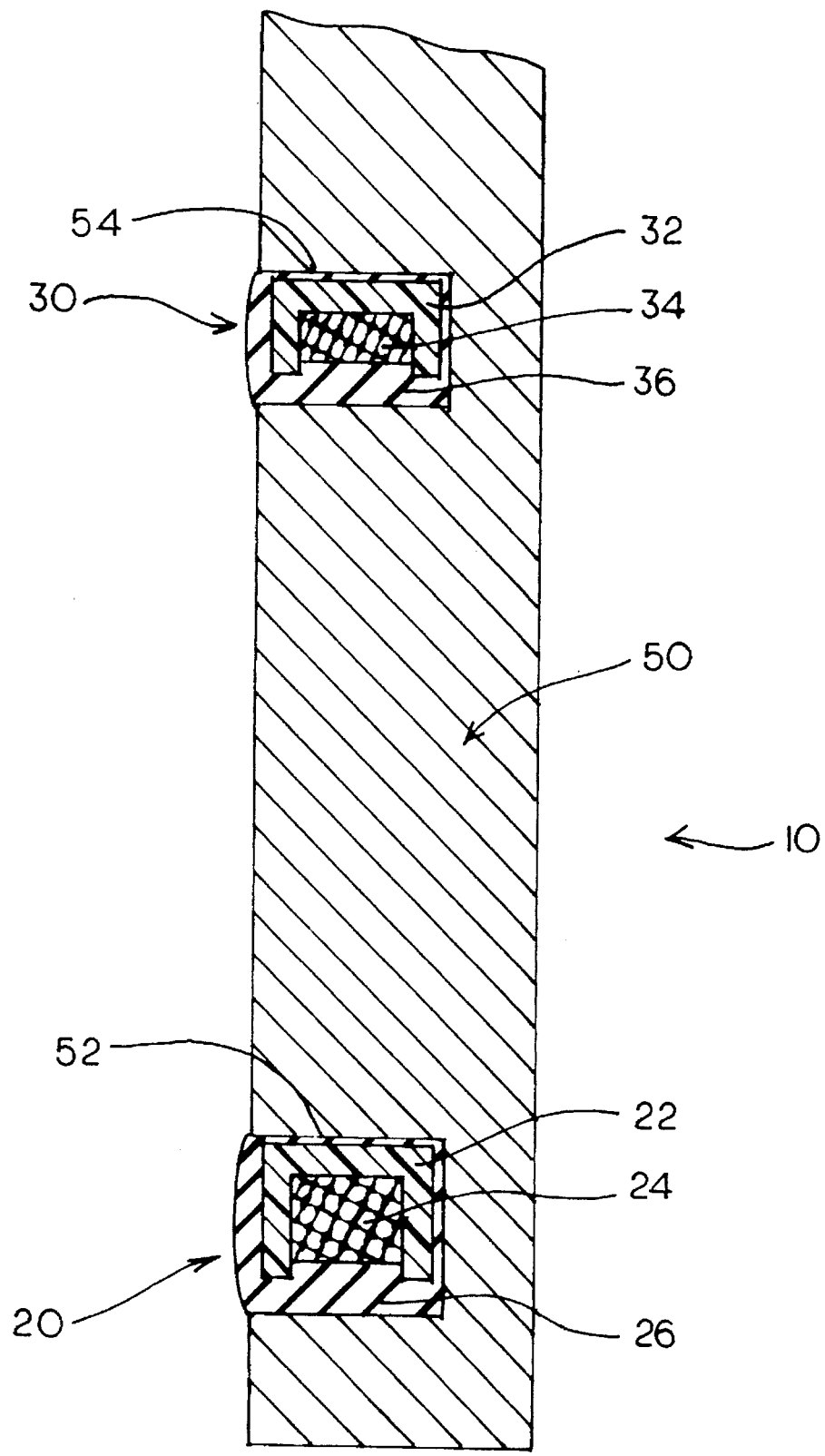
FIG. 2 is a cross-sectional view taken along line 2—2 of FIG. 1.

FIG. 2 shows a partial cross section of the apparatus, detailing the construction of the support disc 50 and the outer and inner coils 20, 30, respectively. The support disc 50 is formed from a non-conductive material, such as polycarbonate, and is machined or formed with concentric channels 52, 54 for housing the respective outer and inner coils 20, 30. Before being mounted in the support disc channels 52, 54, the respective coils 20, 30 are formed by winding multiple turns of conductive wire 24, 34 around preformed hoops or rims 22, 32, which may also be polycarbonate. During the winding, the wire may be coated with, for example, polystyrene to facilitate more precise control of the coil radius and to ensure concentricity. Upon completion the wire windings 24, 34 are secured to the rims 22, 32, such as by epoxy 26, 36, and the individual coils 20, 30 are mounted in the channels 52, 54 within the support disc 50.

The outer coil 20 acts as the principal transmitter of the active dipolar magnetic field for inducing magnetic fields in conductive materials such as groundwater contaminants, buried ordnance, subterranean tank systems, buried pollution sources, ore deposits, and salt water. Therefore, the outer coil 20 has a larger radius and, preferably, a greater number of turns of electrical wire than the inner coil 30 so as to generate a stronger primary magnetic field 81 than the secondary magnetic field 82 generated by the inner coil 30.

Figure 3:
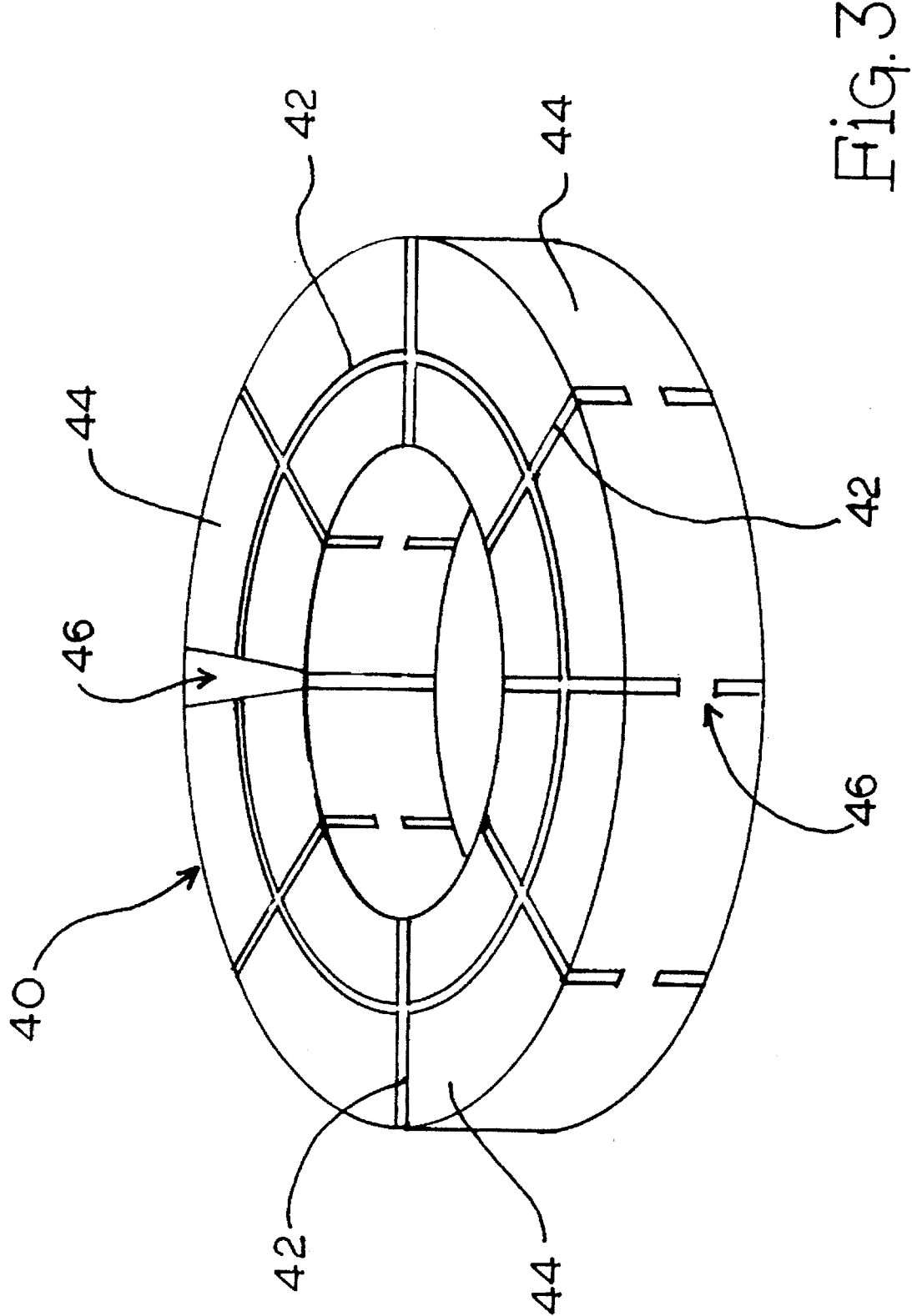
FIG. 3 shows a perspective view of a magnetic sensor coil that forms a part of the electromagnetic sensing apparatus.

In the embodiment shown here, the magnetic sensor comprises a third coil 40 concentric with the outer and inner coils 20, 30. However, the magnetic sensor used in the electromagnetic sensing apparatus 10 could be any conventional magnetic sensing device; for example, a very small point-type magnetic sensor could be used instead of the third coil 40. The sensor coil 40, shown in detail in FIG. 3, is wound from multiple turns of conductive wire in much the same way as the outer and inner magnetic field generating coils 20, 30. It is especially important, however, for the sensor coil 40 to be electrostatically shielded to prevent extraneous emf induction. Shown here, the sensor coil 40 includes flat wire strips 42, which may be a copper conductor, as well as a layer of conductive coating 44, which may be a 200 ohm conductive paint. It is important that the continuity of the the shielding 42, 44 be broken by gaps 46 so as to prevent induced electric current loops in the conductive shielding. The shielding 42, 44 conducts any induced current away from the sensor coil 40 to a ground. The magnetic field generating coils 20, 30 may also be similarly shielded, although this is less critical than shielding the sensor coil 40.

Figure 4:
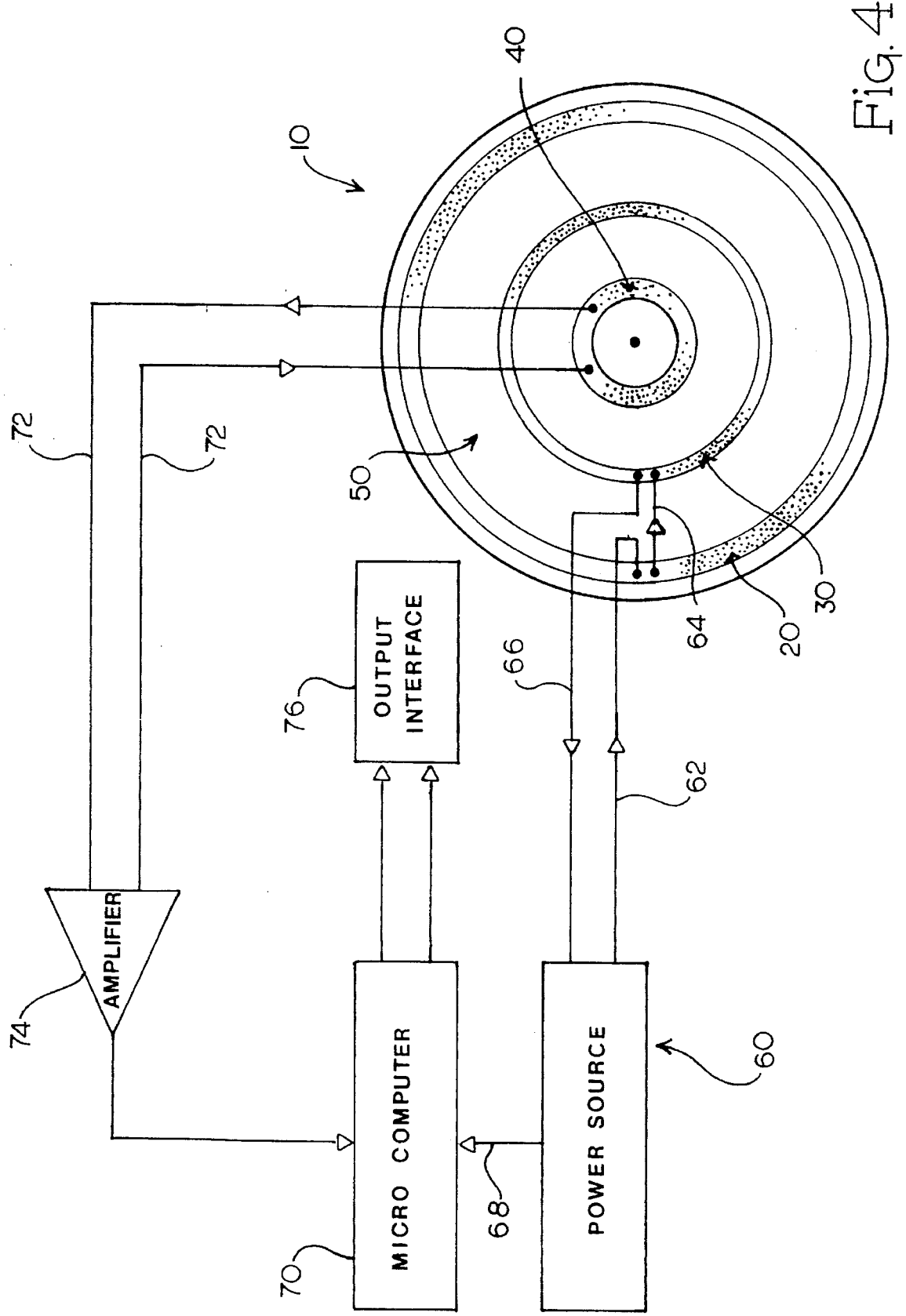
FIG. 4 is a schematic representation of the controller components of the electromagnetic sensing apparatus.

FIG. 4 shows a schematic representation of the controls and wiring of the electromagnetic sensing apparatus 10, including the power source 60 and the computer 70. The power source 60 includes a low output impedance voltage waveform generator that outputs current to the outer coil 20 through line 62, while outputting the same current to the computer 70 through line 68 for comparison analysis. The outer coil 20 is connected in series to the inner coil 30 by line 64. The current returns to the power source 60 from the inner coil 30 through line 66. The computer 70 receives output emf voltage from the sensor coil 40 through output lines 72 and a high input impedance voltage amplifier 74. The computer 70 compares the phase and amplitude of the electric current travelling through line 68 from the power source 60 with the relative phase and amplitude of the induced emf current received from the sensor coil 40. By comparing these parameters of the known output current, which generates the primary (and secondary) magnetic field, with the parameters of the received current induced in the sensor 40 by a detected, induced magnetic field in a remote material, such as buried pollution sources, various properties of the remote material can be ascertained in conventional fashion. An output interface 76 displays information such as the relative amplitude of the received waveform and the relative phase of the received waveform.

Figure 5:
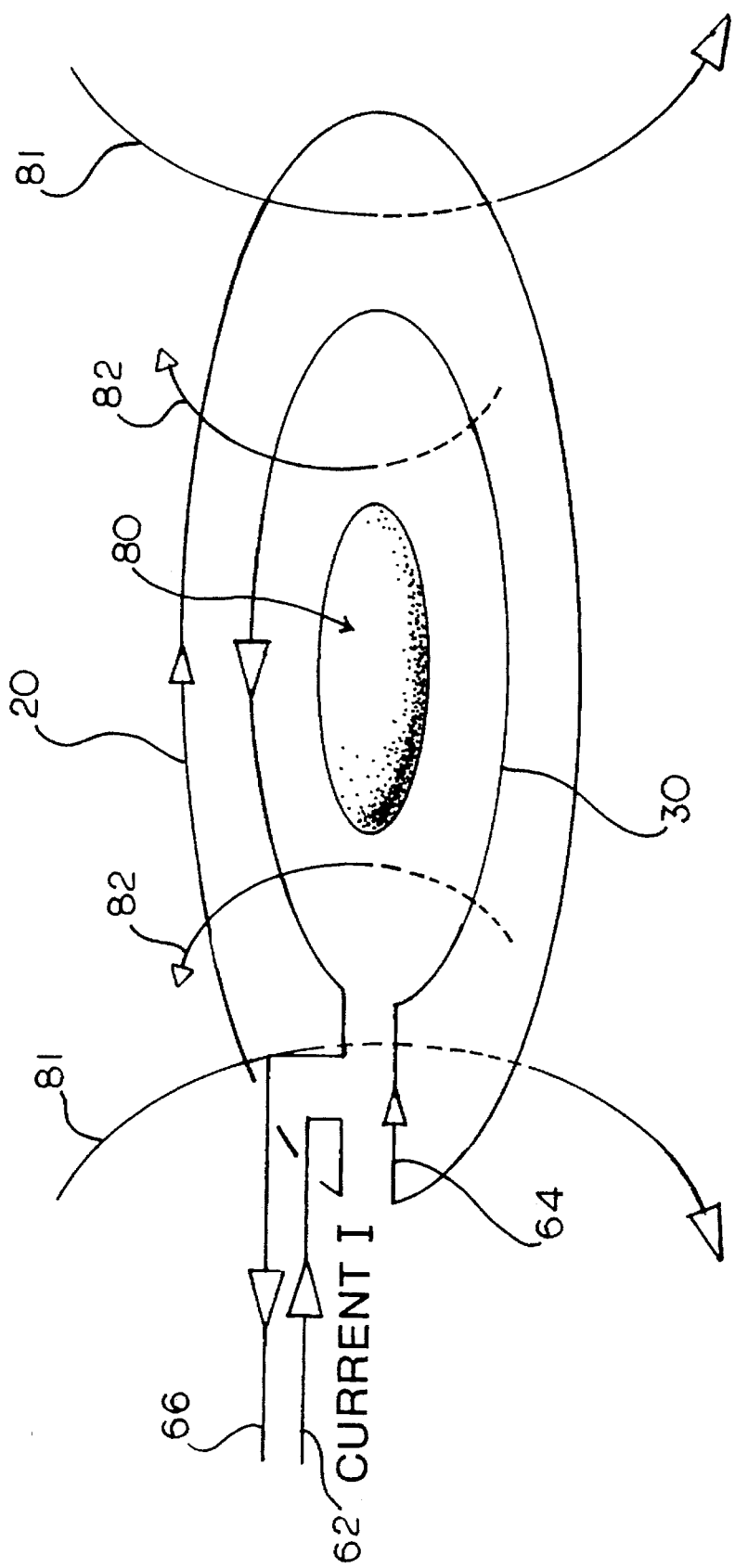
FIG. 5 is a schematic illustration showing the creation of a magnetic cavity around the centerpoint of concentric, magnetic field generating coils.

FIG. 5 shows a conceptual representation of the creation of a magnetic cavity 80 by the apparatus 10. A magnetic cavity is defined as a region within a magnetic field where a magnetic sensor, placed in a specified orientation, produces approximately zero electromotive force (emf) induced from the magnetic field. The electromagnetic sensing apparatus 10 of the present invention creates the magnetic cavity 80 in a region about the centerpoint or reference point 90 of the two concentric, circular, electrical coils 20, 30. The magnetic cavity 80, once created, is used to magnetically isolate the magnetic sensor 40 from the primary and secondary magnetic fields 81, 82 within the electromagnetic sensing apparatus 10. In the absence of flux from the primary and secondary magnetic fields 81, 82 in the magnetic cavity 80, the sensor 40 is capable of measuring very small variations in an induced magnetic field away from the apparatus 10.

Because the magnetic cavity 80 is to be created at the center of current-carrying coils the near-field characteristics of a magnetic field generated by a hypothetical, single, circular coil having a radius $a$ and carrying a current $I$ should be analyzed. In considering the magnetic field strength at an arbitrary point $P(r,\theta)$ off the z axis of the circular coil, due to the azimuthal symmetry, the scalar magnetic potential function $V_m$ can be expressed as:

$$V_m(r,\theta) = A_0 P_0(\cos\theta) + A_1 P_1(\cos\theta) + \ldots + \frac{B_0}{r} + \frac{B_1}{r^2} P_1(\cos\theta) + \ldots \quad \text{(Equation 1)}$$

where $V_m$ satisfies Laplace equation $\nabla^2 V_m = 0$ and $P_n$ is the n-th order Legendre function. On the axis along $\theta=0$, $V_m$ can be analytically shown to be $$V_m(r=z; \theta=0) = \frac{\mu_0 I}{2}\left(1 - \frac{z}{\sqrt{a^2+z^2}}\right) \quad \text{(Equation 2)}$$

which is true for any value z along the axis.

Magnetic permeability of free space is expressed as $\mu_0$ that has a value of $4\pi \times 10^{-7}$ henry/m. Equation 2 can be expanded into a Taylor series in terms of either (a/z) for a<z or (z/a) for a>z, depending on whether the point $P(r,\theta)$ is within or outside of the coil. By comparing the coefficients of the power series with those of Equation 1, the following two equations are satisfied:

$$V_m(r,\theta) = \frac{\mu_0 I}{2}\left[1 - \left(\frac{r}{a}\right) P_1(\cos\theta) + \left(\frac{r}{a}\right)^3 P_3(\cos\theta) + \left(\frac{r}{a}\right)^5 P_5(\cos\theta) + \ldots\right] \quad \text{for } r \leq a \quad \text{(Equation 3a)}$$

and $$V_m(r,\theta) = \frac{\mu_0 I}{2}\left[\frac{1}{2}\left(\frac{r}{a}\right)^2 P_1(\cos\theta) - \frac{3}{8}\left(\frac{r}{a}\right)^4 P_3(\cos\theta) + \ldots\right] \quad \text{(Equation 3b)}$$

for $r \geq a$.

Note that at r=a, Equations 3a and 3b produce identical values.

Vector magnetic field $B(r,\theta)$ can be derived from the potential function through $$B(r,\theta) = -\nabla V_m(r,\theta) \quad \text{(Equation 4)}$$

for which $B_z$, the field perpendicular to the plane of the coil, may be computed by $$B_z = -\cos\theta \frac{\partial V_m}{\partial r} + \frac{\sin\theta}{r}\frac{\partial V_m}{\partial \theta}. \quad \text{(Equation 5)}$$

Taking derivatives as required by Equation 5 and letting $\theta=90°$ (i.e., component into the plane of the current coil), the magnetic field is obtained as a function of radial distance r on the plane of the coil:

$$B_z(r) = \frac{\mu_0 I}{2a}\left[1 + \left(\frac{1}{2}\right)^2 3\left(\frac{r}{a}\right)^2 + \left(\frac{1 \cdot 3}{2 \cdot 4}\right)^2 5\left(\frac{r}{a}\right)^4 + \left(\frac{1 \cdot 3 \cdot 5}{2 \cdot 4 \cdot 6}\right)^2 7\left(\frac{r}{a}\right)^6 + \left(\frac{1 \cdot 3 \cdot 5 \cdot 7}{2 \cdot 4 \cdot 6 \cdot 8}\right)^2 9\left(\frac{r}{a}\right)^8 + \ldots\right]$$

for $r \leq a$; outside the coil; (Equation 6a)
and $$B_z(r) = -\frac{\mu_0 I}{2a}\left(\frac{a}{r}\right)^2\left[\frac{1}{2} + \left(\frac{1 \cdot 3}{2 \cdot 4}\right)^2 4\left(\frac{a}{r}\right)^2 + \left(\frac{1 \cdot 3 \cdot 5}{2 \cdot 4 \cdot 6}\right)^2 6\left(\frac{a}{r}\right)^4 + \left(\frac{1 \cdot 3 \cdot 5 \cdot 7}{2 \cdot 4 \cdot 6 \cdot 8}\right)^2 8\left(\frac{a}{r}\right)^6 + \ldots\right]$$

for $r \geq a$; outside the coil. (Equation 6b)

As r becomes much greater than a, the far-field approximation yields $$B_z(r) = -\frac{\mu_0 I a^2}{4r^3} = -\frac{\mu_0 M}{4\pi r^3} \quad \text{(Equation 7)}$$

where $M$ (magnetic moment) $= I\pi a^2$ which is the classical expression for a dipolar magnetic field.

Figure 6:
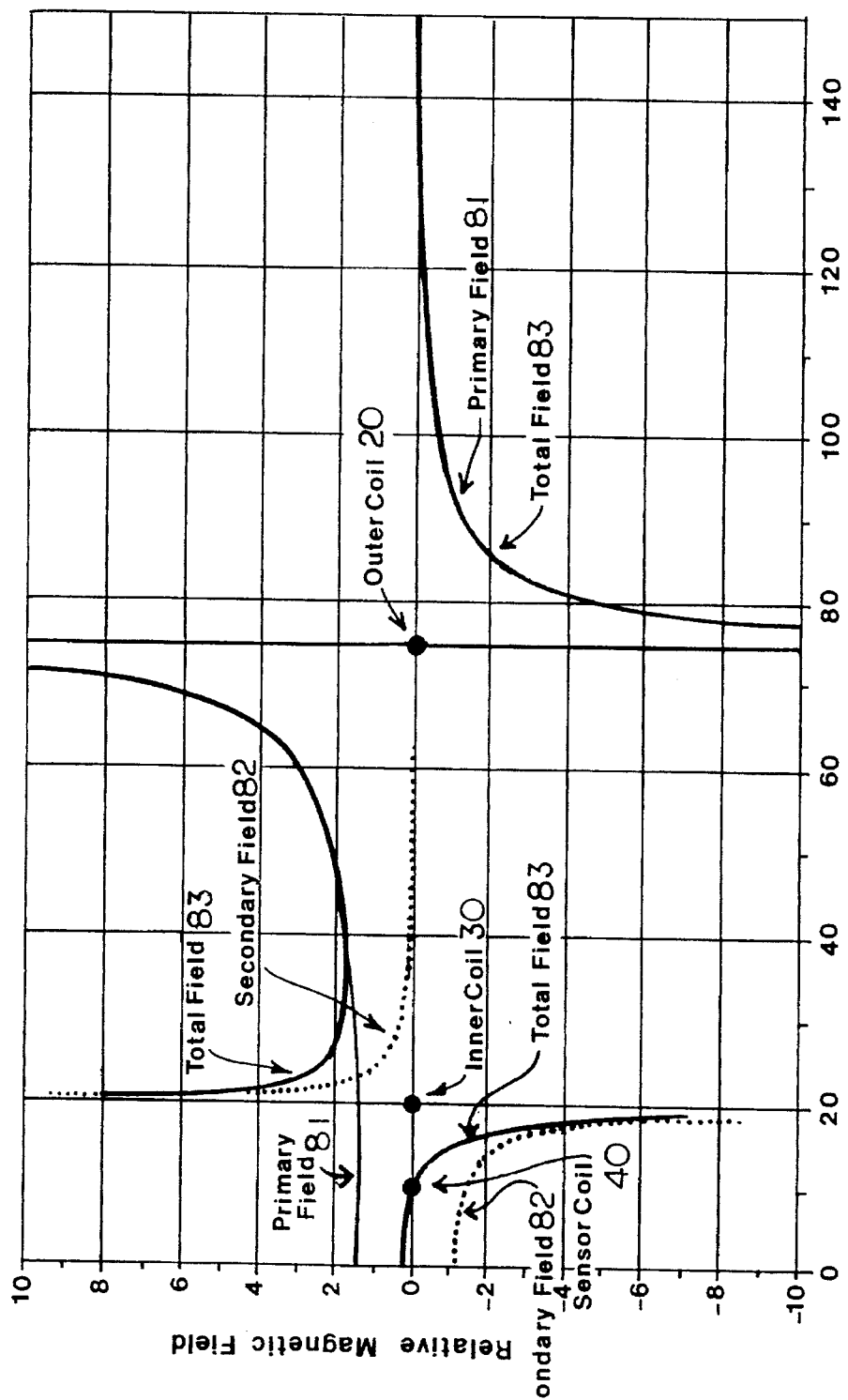
FIG. 6 is a graph of relative magnetic field strength as a function of radial distance for the three-coil system of the electromagnetic sensing apparatus.

At the centerpoint of the coil, the magnetic field is flat and has a vanishing gradient. Far-field strength, which is the magnetic field strength outward of the coil, follows Equation 7 as the distance increases. Near the centerpoint, the magnetic field is strong yet spatially stable. This concept is demonstrated in the present invention, as shown in FIG. 6, by the flatness of the primary and secondary magnetic fields 81, 82 near the centerpoint 90. This spatial stability is a major asset that enables the creation of the magnetic cavity 80 by superimposing the stable, yet oppositely polarized, secondary magnetic field 82 on the primary magnetic field 81.

In calculating the parameters of the electromagnetic sensing apparatus 10 of the present invention so as to create the magnetic cavity 80 about the centerpoint 90 of the outer and inner coils 20, 30, five variables must be considered:

$R_1$: the radius of the outer coil;

$n_1$: the number of turns of wire in the outer coil;

$R_2$: the radius of the inner coil;

$n_2$: the number of turns of wire in the inner coil; and r: the radius of the sensor coil at the center; also, r can be seen as the radius of the magnetic cavity desired, depending on the size and type of magnetic sensor used, if for example the magnetic sensor is a small point-type sensor.

At an arbitrary point at a distance of r from the centerpoint 90 on the plane of the outer coil 20, the primary magnetic field 81 is then calculated:

$$B_z^1(r) = \frac{\mu_0 I n_1}{2R_1}\left[1 + \left(\frac{1}{2}\right)^2 3\left(\frac{r}{R_1}\right)^2 + \left(\frac{1 \cdot 3}{2 \cdot 4}\right)^2 5\left(\frac{r}{R_1}\right)^4 + \left(\frac{1 \cdot 3 \cdot 5}{2 \cdot 4 \cdot 6}\right)^2 7\left(\frac{r}{R_1}\right)^6 + \ldots\right].$$ (Equation 8a)

Likewise, at an arbitrary point at a distance r from the centerpoint 90 on the plane of the inner coil 30, the secondary magnetic field 82 is calculated:

$$B_z^2(r) = \frac{\mu_0 I n_2}{2R_2}\left[1 + \left(\frac{1}{2}\right)^2 3\left(\frac{r}{R_2}\right)^2 + \left(\frac{1 \cdot 3}{2 \cdot 4}\right)^2 5\left(\frac{r}{R_2}\right)^4 + \left(\frac{1 \cdot 3 \cdot 5}{2 \cdot 4 \cdot 6}\right)^2 7\left(\frac{r}{R_2}\right)^6 + \ldots\right].$$ (Equation 8b)

A mathematical relationship must exist among the parameters of the apparatus 10 in order that creation of the magnetic cavity 80 is possible. In deriving this relationship, a value of zero is assigned to the radius of the sensor coil 40 (radius of the magnetic cavity). Voltage output (emf) of the sensor coil 40 is proportional to the surface integral of the two oppositely polarized magnetic fields 81, 82, which is expressed by Equations 8a and 8b:

$$emf = \int_0^r [B_z^1(r) - B_z^2(r)] 2\pi r dr.$$ (Equation 9)

For a magnetic cavity, there is a vanishing emf, therefore:

$$\int_0^r B_z^1(r) r dr = \int_0^r B_z^2(r) r dr.$$ (Equation 10)

By integrating Equations 8a and 8b and substituting them into Equation 10, the following functional equation is derived for calculating the five aforementioned variable parameters of the apparatus 10, wherein there is zero induced emf in the sensor coil 40 having a radius r:

$$\frac{n_1}{R_1}\left[\frac{1}{2} + \left(\frac{1}{2}\right)^2 \frac{3}{4}\left(\frac{r}{R_1}\right)^2 + \right.$$ (Equation 11)

$$\left(\frac{1 \cdot 3}{2 \cdot 4}\right)^2 \frac{5}{6}\left(\frac{r}{R_1}\right)^4 + \left(\frac{1 \cdot 3 \cdot 5}{2 \cdot 4 \cdot 6}\right)^2 \frac{7}{8}\left(\frac{r}{R_1}\right)^6 + \ldots\right] =$$

$$\frac{n_2}{R_2}\left[\frac{1}{2} + \left(\frac{1}{2}\right)^2 \frac{3}{4}\left(\frac{r}{R_2}\right)^2 + \left(\frac{1 \cdot 3}{2 \cdot 4}\right)^2 \frac{5}{6}\left(\frac{r}{R_2}\right)^4 + \left(\frac{1 \cdot 3 \cdot 5}{2 \cdot 4 \cdot 6}\right)^2 \frac{7}{8}\left(\frac{r}{R_2}\right)^6 + \ldots\right].$$

Equation 11 provides the basic relations among the radii of the sensor coil 40 and the outer and inner concentric magnetic field generating coils 20, 30, as well as the number of turns of wire of the coils, which results in zero sensor induced emf when the sensor 40 is positioned within the magnetic cavity 80 thus created.

FIG. 6 shows an example of the magnetic field characteristics of the apparatus of the invention given the parameters, calculated using Equation 11, of: $R_1$= 75 cm, $R_2$ = 20 cm, $n_1$= 100 turns, r= 10 cm, and $n_2$=24.15 turns. While these numbers are used to provide a simplistic example, in reality, parameters would preferably be chosen so that the number of turns of wire in the outer and inner coils ($n_1$ and $n_2$, respectively) would be integral numbers. The graph in FIG. 6 presents the relative magnetic field strength as a function of radial distance for the three-coil system of the magnetic sensing apparatus 10. Total magnetic field 83 is the sum of the primary magnetic field 81 from the outer coil 20 and the secondary field 82 of opposite polarity from the inner coil 30. It should be noted that the total magnetic field 83 within the region encircled by the sensor coil 40 is small and varies slightly, starting positive at the centerpoint 90 and gradually changing to negative toward the perimeter of the sensor coil 40. A real integral of the total magnetic field 83 within the sensor coil 40, however, vanishes precisely according to Equation 10 so as to produce zero induced emf output by the sensor coil 40.

Because the secondary magnetic field 82 has an opposite polarity from the primary magnetic field 81, the secondary magnetic field 82 slightly reduces the amplitude of the primary magnetic field 81 outwardly of the coils. The degree of the amplitude loss can be predicted using Equation 7 such that:

$$\text{Amplitude Loss at Far Field} = \frac{n_2}{n_1}\left(\frac{R_2}{R_1}\right)^2.$$ (Equation 12)

With the parameters of the above example, Equation 12 predicts a primary magnetic field amplitude loss of only 1.72%, which equals a power loss of 0.03%. This negligible diminution in far-field strength (primary magnetic field strength beyond the outer coil 20) is reflected in FIG. 6 by noting that on this graph there is no perceivable difference between the primary magnetic field 81 and the total magnetic field 83 beyond the outer coil 20.

The present invention accomplishes the objective of creating a magnetic cavity in close proximity to a strong primary magnetic field by effectively cancelling the primary magnetic field in a given area. This is achieved by strategically interposing a secondary magnetic field on the primary magnetic field, thereby allowing a highly sensitive magnetic sensor to be positioned within the primary magnetic field without interference from the primary or secondary magnetic fields.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An apparatus having two electrical coils that generate magnetic fields that mutually cancel each other to create a magnetic cavity, comprising:

(a) a first electrical coil spaced a predetermined radius from a reference point and having a predetermined number of turns of wire;

(b) a second electrical coil, disposed within the first coil, spaced a predetermined radius from the reference point and having a predetermined number of turns of wire;

(c) a sensor coil disposed inwardly of the second coil and having a predetermined radius;

(d) the first and second coils connected to an electrical power source such that the first and second coils respectively produce primary and secondary magnetic fields;

(e) wherein the first and second coils are spaced from the reference point such that the primary and secondary magnetic fields mutually cancel each other in an area inwardly of the two coils so as to create a magnetic cavity in which the amplitudes of the primary and secondary magnetic fields are substantially zero, the sensor coil within the magnetic cavity; and (f) wherein the radii and the number of turns of wire of the first and second coils and the radius of the sensor coil are calculated according to the following equation:

$$\frac{n_1}{R_1}\left[\frac{1}{2}+\left(\frac{1}{2}\right)^2\frac{3}{4}\left(\frac{r}{R_1}\right)^2+\left(\frac{1\cdot 3}{2\cdot 4}\right)^2\frac{5}{6}\left(\frac{r}{R_1}\right)^4+\left(\frac{1\cdot 3\cdot 5}{2\cdot 4\cdot 6}\right)^2\frac{7}{8}\left(\frac{r}{R_1}\right)^6+\cdots\right]=\frac{n_2}{R_2}\left[\frac{1}{2}+\left(\frac{1}{2}\right)^2\frac{3}{4}\left(\frac{r}{R_2}\right)^2+\left(\frac{1\cdot 3}{2\cdot 4}\right)^2\frac{5}{6}\left(\frac{r}{R_2}\right)^4+\left(\frac{1\cdot 3\cdot 5}{2\cdot 4\cdot 6}\right)^2\frac{7}{8}\left(\frac{r}{R_2}\right)^6+\cdots\right]$$

wherein:
$R_1$= the radius of the first coil;
$n_1$= the number of turns of wire of the first coil;
$R_2$= the radius of the second coil;
$n_2$= the number of turns of wire of the second coil; and
$r$= the radius of the sensor coil.

2. The apparatus of claim 1 further comprising a structure made of a non-conductive material for housing the coils.

3. A method for creating a magnetic cavity, comprising the steps of:

(a) forming an outer coil, having a predetermined radius about a centerpoint, with a predetermined number of turns of wire;

forming an inner coil, having a predetermined radius about the centerpoint, with a predetermined number of turns of wire;

(c) orienting the outer and inner coils such that they are concentric;

(d) conducting an electric current through the outer coil in one direction and through the inner coil in an opposite direction;

(e) generating a primary magnetic field around the outer coil;

(f) generating a secondary magnetic field, having an opposing polarity from the primary magnetic field, around the inner coil;

(g) mutually canceling the magnetic fields within a region about the centerpoint, inwardly of the two coils, thereby forming a magnetic cavity in which the amplitudes of the primary and secondary magnetic fields are substantially zero; and (h) disposing a sensor coil having a predetermined radius within the magnetic cavity;

(i) wherein the radii and number of turns of wire of the first and second coils and the radius of the sensor coil are determined according to the equation:

$$\frac{n_1}{R_1}\left[\frac{1}{2}+\left(\frac{1}{2}\right)^2\frac{3}{4}\left(\frac{r}{R_1}\right)^2+\left(\frac{1\cdot 3}{2\cdot 4}\right)^2\frac{5}{6}\left(\frac{r}{R_1}\right)^4+\left(\frac{1\cdot 3\cdot 5}{2\cdot 4\cdot 6}\right)^2\frac{7}{8}\left(\frac{r}{R_1}\right)^6+\cdots\right]=\frac{n_2}{R_2}\left[\frac{1}{2}+\left(\frac{1}{2}\right)^2\frac{3}{4}\left(\frac{r}{R_2}\right)^2+\left(\frac{1\cdot 3}{2\cdot 4}\right)^2\frac{5}{6}\left(\frac{r}{R_2}\right)^4+\left(\frac{1\cdot 3\cdot 5}{2\cdot 4\cdot 6}\right)^2\frac{7}{8}\left(\frac{r}{R_2}\right)^6+\cdots\right]$$

wherein:
$R_1$= the radius of the first coil;
$n_1$= the number of turns of wire of the first coil;
$R_2$= the radius of the second coil;
$n_2$= the number of turns of wire of the second coil; and
$r$= the radius of the sensor coil.

4. The method of claim 3 including the step of connecting the outer coil and the inner coil in series.

5. The method of claim 3 including the step of detecting a relatively weak external magnetic field, which is induced by the primary magnetic field, in the presence of the primary and secondary magnetic fields by disposing the sensor coil within the magnetic cavity such that the primary and secondary fields do not interfere with the detecting of the relatively weak external magnetic field by the sensor coil.

6. A method of sensing a relatively weak external magnetic field in the presence of a relatively strong magnetic field, comprising the steps of:

(a) forming a first electrical coil concentrically with a second electrical coil about a centerpoint, the first coil formed from a predetermined number of turns of wire and the second coil also formed from a predetermined number of turns of wire;

(b) connecting the first and second electrical coils in series;

(c) conducting an electric current through the first coil in one direction and through the second coil in an opposite direction;

(d) generating a relatively strong primary magnetic field around the first coil and a weaker, secondary magnetic field, which has an opposite polarity from the primary magnetic field, around the second coil;

(e) creating a magnetic cavity in a region around the centerpoint of the coils by mutually canceling the primary and secondary magnetic fields inwardly of the two coils;

(f) positioning a third coil concentric with the first and second coils within the magnetic cavity, the third coil having a predetermined radius about the centerpoint; and (g) sensing the external magnetic field with the magnetic sensor;

(h) wherein the radii and number of turns of wire of the first and second coils and the radius of the sensor coil are determined according to the equation:

$$\frac{n_1}{R_1}\left[\frac{1}{2}+\left(\frac{1}{2}\right)^2\frac{3}{4}\left(\frac{r}{R_1}\right)^2+\left(\frac{1\cdot 3}{2\cdot 4}\right)^2\frac{5}{6}\left(\frac{r}{R_1}\right)^4+\left(\frac{1\cdot 3\cdot 5}{2\cdot 4\cdot 6}\right)^2\frac{7}{8}\left(\frac{r}{R_1}\right)^6+\cdots\right]=\frac{n_2}{R_2}\left[\frac{1}{2}+\left(\frac{1}{2}\right)^2\frac{3}{4}\left(\frac{r}{R_2}\right)^2+\left(\frac{1\cdot 3}{2\cdot 4}\right)^2\frac{5}{6}\left(\frac{r}{R_2}\right)^4+\left(\frac{1\cdot 3\cdot 5}{2\cdot 4\cdot 6}\right)^2\frac{7}{8}\left(\frac{r}{R_2}\right)^6+\cdots\right]$$

wherein:
$R_1$ = the radius of the first coil;
$n_1$ = the number of turns of wire of the first coil;
$R_2$ = the radius of the second coil;
$n_2$ = the number of turns of wire of the second coil; and
$r$ = the radius of the sensor coil.

7. An apparatus for transmitting a relatively strong magnetic field, which induces an external, induced magnetic field of relatively low amplitude, and for sensing the external, induced magnetic field in the presence of the relatively strong magnetic field, comprising:

(a) first and second concentric electrical coils connected in series such that electricity flows in opposite directions through the first and second coils;

(b) wherein the first electrical coil generates a primary magnetic field for inducing an external magnetic field in a remote conductive material of relatively low amplitude compared to the amplitude of the primary magnetic field;

(c) wherein the second electrical coil generates a secondary magnetic field having an opposite polarity from the primary magnetic field;

(d) a magnetic cavity formed in a region inwardly of the first and second coils that is substantially free of magnetic flux of the primary and secondary magnetic fields, wherein the magnetic cavity is formed by selectively sizing the first and second coils with predetermined radii and with predetermined numbers of turns of wire so that the primary and secondary magnetic fields mutually cancel each other in the region inwardly of the first and second coils; and (e) a magnetic sensor disposed within the magnetic cavity for sensing the external, induced magnetic field;

(f) wherein the magnetic cavity has a radius smaller than the radii of the first and second coils, and wherein the radii and number of turns of wire of the first and second coils and the radius of the magnetic cavity are determined according to the equation:

$$\frac{n_1}{R_1}\left[\frac{1}{2}+\left(\frac{1}{2}\right)^2\frac{3}{4}\left(\frac{r}{R_1}\right)^2+\left(\frac{1\cdot 3}{2\cdot 4}\right)^2\frac{5}{6}\left(\frac{r}{R_1}\right)^4+\left(\frac{1\cdot 3\cdot 5}{2\cdot 4\cdot 6}\right)^2\frac{7}{8}\left(\frac{r}{R_1}\right)^6+\cdots\right]=\frac{n_2}{R_2}\left[\frac{1}{2}+\left(\frac{1}{2}\right)^2\frac{3}{4}\left(\frac{r}{R_2}\right)^2+\left(\frac{1\cdot 3}{2\cdot 4}\right)^2\frac{5}{6}\left(\frac{r}{R_2}\right)^4+\left(\frac{1\cdot 3\cdot 5}{2\cdot 4\cdot 6}\right)^2\frac{7}{8}\left(\frac{r}{R_2}\right)^6+\cdots\right]$$

wherein:
$R_1$ = the radius of the first coil;
$n_1$ = the number of turns of wire of the first coil;
$R_2$ = the radius of the second coil;
$n_2$ = the number of turns of wire of the second coil; and
$r$ = the radius of the magnetic cavity.

8. The apparatus of claim 1 wherein the magnetic sensor comprises a third coil, concentric with the first and second coil.

9. The apparatus of claim 8 wherein the first and second coils are coplanar.

* * * * *